United States Patent [19]

Bechtolsheim

[11] Patent Number: 4,527,232
[45] Date of Patent: Jul. 2, 1985

[54] HIGH-SPEED MEMORY AND MEMORY MANAGEMENT SYSTEM

[75] Inventor: Andreas V. Bechtolsheim, Stanford, Calif.

[73] Assignee: Sun Microsystems, Inc., Mountain View, Calif.

[21] Appl. No.: 394,555

[22] Filed: Jul. 2, 1982

[51] Int. Cl.$^3$ ............................................. G06F 9/34
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 364/200 |
| 3,723,976 | 3/1973 | Alvarez et al. | 364/200 |
| 3,902,164 | 8/1975 | Kelley et al. | 364/200 |

*Primary Examiner*—Harvey E. Springborn
*Attorney, Agent, or Firm*—Blakely Sokoloff Taylor & Zafman

[57] ABSTRACT

A method and apparatus for accessing a particular location in a main memory of a computer in which virtual addresses from a CPU are separated into direct and indirect address segments. The direct address segment is applied directly to one of row and column control lines that identify such location in the memory and the indirect address segment is translated into a real address segment and applied to the other of the row and column control lines of the main memory that identify the particular memory location. The row and column control lines are strobed with sequential pulses such that the control line to which the direct address segment is applied is strobed prior to the control line to which the translated real address segment is applied.

5 Claims, 2 Drawing Figures

HIGH-SPEED MEMORY AND MEMORY MANAGEMENT SYSTEM

TECHNICAL FIELD

The invention relates to digital data processing and more specifically to the construction of memory systems for computers that involve address translation and memory management.

BACKGROUND ART

Memory systems and subsystems are used by computers to store programs and data. Memory management provides capabilities such as multiple address spaces for separate processes, sharing of memory between processes, relocation of logical processor addresses into physical memory addresses, and protecting memory areas by only allowing certain operations such as read, write or execute, to such areas.

In addition, memory management units often provide so-called virtual memory capabilities. Virtual memory means that a processor can address more memory than there is physically present in main memory. This is usually done by dividing the total memory space into many small equal size units called pages. The entire memory space is stored on a secondary storage device, such as disk storage. During execution of the program only those pages are brought into main memory that are required on demand, replacing other pages that are no longer necessary. Virtual memory management schemes usually have mechanisms that assist in the page replacement operation, such as maintaining a status for each page whether it had recently been used or whether it had been written into.

The principles of memory management have been known since the early history of computers and are commonplace in state-of-the-art computing equipment. However, the usage of memory management schemes normally results in a loss of performance for the computer operation because each access to memory has to be translated and checked by the memory management unit, adding to the access time of memory and incurring a delay between the time the processor issues the address to be translated until the data is received from memory.

DISCLOSURE OF INVENTION

An object of the invention is to minimize the delay incurred by a memory management unit in accessing a computer memory. The above object of the invention is realized by overlapping the delay time through the memory management unit with the access time of memory. This is achieved by a computer memory addressed with row and column addresses and a memory management unit that allows low-order addresses to pass directly into the row address of the computer memory whereas the high-order addresses pass through the memory management unit and enter the column address of the computer memory.

The system utilizes an address bus extending from a processor to a memory management means. The address bus splits memory addresses into pre-defined direct and indirect address segments. The direct address segments are fed directly to a computer main memory array of the type having rows and columns of control lines for bit storage elements which are located at intersections of the control lines. While the direct address segments are fed to either of the rows or columns of the main memory, the indirect address segments are fed to a memory management means which translates the indirect segments to a physical address. The translated indirect address segments are then fed to the other of the rows or columns of the main memory array, so that rows and columns of the main memory array are controlled by the direct address segments on the one hand and the translated indirect address segments on the other hand. The rows and columns of the main memory array have connected driver circuits for enabling access to the storage elements. A timing generator is provided for strobing the row and column driver circuits with sequential pulses. While the direct address segments arrive first at main memory and are strobed first, the translated indirect address segments arrive shortly thereafter and are strobed second, thereby permitting access to storage locations in main memory. The time between the two strobing pulses is used for indirect address translation, reducing memory access time.

In addition, the invention minimizes the address translation time of the memory management unit by using high-speed static RAM (random-access-memory) for the translation process and by using the same RAM address lines both for address input and for accessing the entries of the memory management means in order to modify the translation.

DESCRIPTION OF PREFERRED EMBODIMENT

Figure 1:
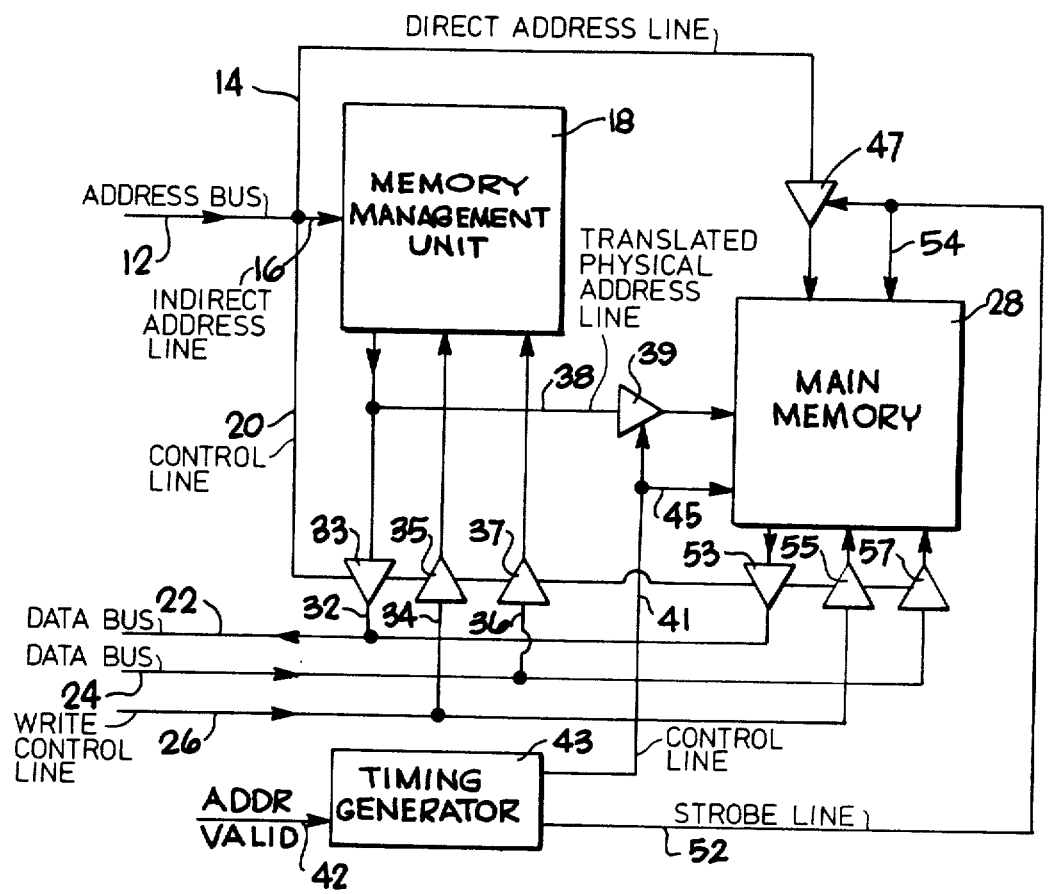
FIG. 1 is a block diagram of a high-speed computer memory in accord with the present invention.

With reference to FIG. 1, a processor, not shown, communicates with the system of the present invention via an address bus 12. Such a bus has a plurality of individual lines which carry addresses in the form of multi-bit words. Typically, processors may use address busses between 16 and 32 words in which the bits are transmitted in parallel along individual lines or wires which form the address bus. In the present invention, addresses transmitted over the address bus are structured such that low-order bits form a direct address for main memory, with the low-order bits being split off from the address bus along line 14. On the other hand, the high-order address bits form an indirect address which is taken along line 16 and fed to a memory management unit 18. For example, in the case of a 21-bit address, 10 low-order bits may form the direct address transmitted along line 14 while 10 high-order bits are transmitted as indirect addresses over line 16. The most significant bit may be a control bit transmitted along control line 20.

The memory management unit 18 is a relatively high-speed random-access memory unit, such as a fast static RAM. Such a RAM may be for example a static RAM shown in the IC Master, published by Hearst Business Communications, Inc./UPT Division, Garden City, N.Y. (1984), which is compatible with the model 68000 microprocessor manufactured by Motorola. This memory means takes as an input the indirect address segment received along line 16, the logical address supplied by the processor, and produces as an output a translated physical address along line 38. The translated physical address in conjunction with the low order address line 14 specifies the physical location in main memory of the desired data.

The processor has a pair of data buses with data to the processor flowing along data bus 22 and data from the processor flowing along data bus 24. A write control line 26 extends from the processor. The data buses 22 and 24 as well as the control line 26 are connected to lines which extend to the memory management unit 18 and to main memory 28. Lines 32, 34 and 36 are respectively connected to data buses 22, 24 and to the write control line 26. Those lines are also connected to drivers 33, 35 and 37, symbolized by triangles having an apex in the direction of data travel. Each of these drivers has an enabling port connected to control line 20. Line 32 serves to transfer data from the memory management unit 18 to the processor via driver 33 and data bus 22. On the other hand, data from the processor is routed via line 36 through driver 37 to the memory management means 18. The write control line 26 transmits a signal to the memory management unit 18 via line 34 and driver 35, allowing the memory management unit 18 to write data which is transmitted from the processor along line 16, which also carries segmented indirect addresses. Data coming out of memory management means 18 along line 32 is also transmitted to main memory 28 via line 38 and driver 39. Driver 39 is enabled via line 41 from a timing generator 43. The timing generator provides both row and column address strobes, e.g. column address strobes along line 41 and thence to line 45 and row address strobe along line 52 and thence to line 54.

Main memory is of the type having rows and columns of control lines for bit storage elements located at intersections of the rows and columns. The location of the storage elements is specified by addresses including the indirect addresses which have been translated by memory management unit 18 into physical addresses which are output along line 38 and driver 39 to main memory 28 for either of the rows or columns of main memory. The other of the rows or columns receives a direct address via line 14 and driver 47. The same lines which communicate data to and from the processor for memory management means 18 serve to communicate with main memory 28. The data buses to and from the processor, namely lines 22 and 24, are connected to main memory 28 via drivers 53 and 57. The write control line 26 is connected to main memory 28 via driver 55. The drivers 53, 55 and 57 are enabled by the control line 20 which can select between memory management unit 18 and main memory 28 for the purpose of indicating which of the two units the processor communicates with.

The timing generator 43 generates two sequential pulses for strobing row and column address lines of the main memory 28. The row address strobe is transmitted along line 52 to the row control lines via line 54. The same pulse enables the driver 47 so that row addresses will arrive at main memory simultaneous with the strobing pulse. The direct address segments transmitted via line 14 are not translated and hence there is no delay in communicating the direct address segments from the processor. The strobing pulse for direct address segments can occur slightly prior to a second pulse transmitted along line 41. The second or delayed pulse serves to strobe translated indirect address segments. The memory management unit 18 translates the indirect addresses to physical addresses which arrive at main memory 28 at a time slightly later than the translated indirect memory addresses.

The translation table stored in memory management unit 18 may be changed by writing new data into the memory management unit. Control line 20 serves to enable or select access for writing or reading either memory management unit 18 or main memory 28 by enabling and disabling respective drivers 33, 35 and 37 on the one hand or 53, 55 and 57 on the other hand. Writing into the memory management means 18 is accomplished using the write control line 26, the indirect segment address lines 16, and control line 20. In other words, the same address lines used previously for reading the translation table in the memory management unit 18 may be used for writing a new table in the memory management unit 18.

In operation, an address traveling down the address bus 12 is split as previously described into direct and indirect address segments. A direct address segment, say a row address, travels along line 14 to the main memory 28, while an indirect address segment, say a column address, is directed along line 16 to memory management means 18. In the memory management means, a relatively high-speed random-access memory, the indirect address segment is translated into a physical address and transmitted outwardly along lines 38 to the main memory 28. At the main memory, sequential timing pulses from timing generator 43 arrive to strobe the row addresses and translated column addresses sequentially to row and column control lines of main memory to access desired storage locations. As soon as an address along line 12 from the processor is received and a valid address is signalled to timing generator 43 along line 42, the timing generator 43 generates a row address strobe along line 52. As soon as the memory management unit 18 has produced the indirect address segment along line 38 the timing generator 43 generates a column address strobe along line 41.

Figure 2:
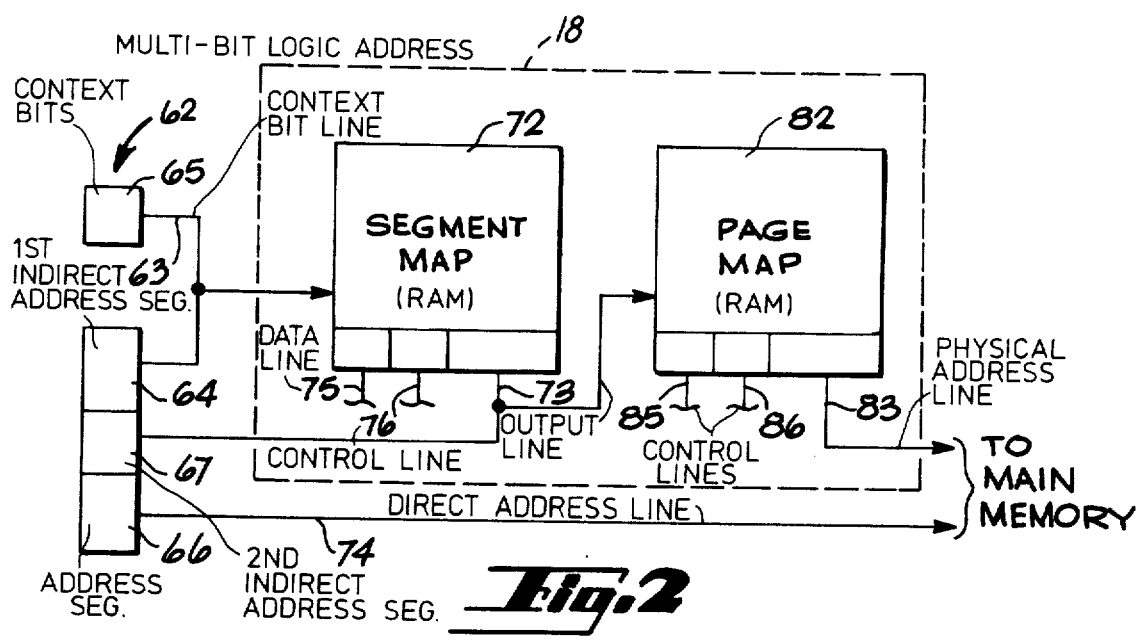
FIG. 2 is a block diagram of a specific implementation of a memory management unit illustrated in FIG. 1.

The memory management unit 18 itself may be partitioned and two levels of indirect addresses used for specifying desired locations in main memory. This is illustrated in FIG. 2. The left-hand column 62 is symbolic of a multi-bit logic address from a processor. The invention has previously been carried out with addresses supplied by a Motorola 68000 processor which has 24-bit address words. Not all of the address lines need be used. Four of the bits in block 65 are identified as context bits supplied by another source which serve to switch between 16 separate portions of the memory management unit indicated by the dashed lines 70. The four bits are fed along line 63 to a segment map 72, a random-access memory which serves to convert logic addresses to translated addresses taken along output line 73. The input to segment map 72 is derived from the indirect address segment symbolized by block 64. As previously mentioned, a context block 65 identifies which of the separate portions of segment map 72 is to be utilized. Once this identification is made the indirect address segment from block 64 can be translated. A direct address segment is symbolized by block 66 and is transmitted directly to main memory along line 74 which is connected to either the row or column control lines of main memory.

As previously mentioned, the segment map 72 converts logic addresses from block 64 to addresses taken along output line 73. Additionally, coded bits of data may be input to segement map 72 via line 75 for memory protection. For example, a read or write data indication may be given along line 75, as well as other protection codes. Other lines, such as line 76 may be provided for still further protection or control. Lines 75 and 76 would typically be controlled by the processor upon command. The address on line 73 generated by the segment map is transmitted to a page map 82, a random-access memory which may be the same size or different size from segment map 72. The function of the page map is to receive the address transmitted along line 73 and combine it with a second indirect address segment, symbolized by block 67 to generate a physical address which is output along line 83. Thus, it may be seen that the memory management unit 18 uses two levels of indirect addresses, a first level symbolized by block 64 which is transmitted to segment map 72 and a second level 67 which is transmitted to page map 82. Both levels are merely specified address bits which are split from an address word and fed directly to the desired memory location. Page map 82 is provided with control lines 85 and 86 which may be used for protection, similar to lines 75 and 76.

If the type of operation to be executed is protected and cannot be executed, the operation is aborted. For example, protection may call for read-only and a write operation is attempted. The protection mechanism would prevent the write operation. This is achieved by generation of an error signal which disables the write strobe from occurring, even though access to main memory has already been initiated.

The output from page map 82 is a translated indirect address which is fed along line 83 to either the rows or columns of main memory not connected to line 74. Together, lines 74 and 83 control rows and columns of main memory as in FIG. 1. Not shown is the timing generator which provides the row and column address strobes. Since line 74 is connected directly to main memory, address bits along this line arrive at main memory slightly prior to the translated indirect address segment. The timing generator strobes the direct address segment first and the translated indirect segment second so that row and column address lines of main memory are activated for accessing specified bit storage locations in the main memory array.

One of the advantages of the present invention is that by splitting addresses into direct and indirect segments, time is saved in accessing main memory because main memory access begins even before the indirect memory address has been translated by the memory management unit. Thus access to main memory is time-overlapped with the translation of the indirect address segment. The direct address segment goes directly to memory and no time is lost, while only the indirect segment is translated. By simultaneously providing a high-speed memory management means, such as a fast random-access memory, translation time can be minimized such that both the direct and translated indirect address segments can be strobed into memory by timing pulses which are slightly offset from each other.

I claim:

1. In a data processing system employing virtual memory management which includes a central processor and a main memory with a plurality of locations for storage of data, each of said locations addressable by a real address, the improvement comprising:
    addressing means coupled to said central processor for providing virtual addresses including direct and indirect address segments, said direct address segment corresponding to a portion of a real address identifying a particular location in said main memory, and said indirect address segment corresponding to a virtual address identifying said particular location in memory;
    an address bus having a plurality of parallel address lines coupled to said addressing means, and further including means for separating said virtual address from said addressing means into said direct and indirect address segments and applying said direct address segment directly to said main memory;
    memory management means coupled to said address bus to receive said indirect address segment for translating said indirect address segment to a real address segment, said memory management means including means for applying said translated real address segment to physical address lines coupled to said main memory;
    said locations in said main memory being defined at intersections of row and column control lines, the address of said particular location in said main memory specified by said translated real address segment and said direct address segment, one of said row and column control lines coupled to receive said direct address segment and and the other of said row and column control lines coupled to receive said translated real address segment;
    timing means for strobing said row and column address lines of said main memory to permit the accessing of data stored at said particular location, said timing means providing said strobe pulses to said main memory such that a strobe pulse for said direct address segment occurs shortly before a strobe pulse for said translated real address segment;
    whereby said direct address segment is provided to said main memory without translation, and said strobe pulse for said direct address segment is applied to said main memory before said translated real address segment is applied to said main memory, thereby increasing the speed of access to said memory locations by beginning said access while said indirect segment is being translated by said memory management means.

2. The data processing system as defined by claim 1, wherein said indirect segment is comprised of first and second indirect address segments, and wherein said memory management means includes segment map means and page map means, said segment map means coupled to receive said first indirect segment for producing an intermediate address coupled to said page map and said page map means coupled to receive said second indirect segment for converting the intermediate address and the second indirect segment into said translated real address.

3. The data processing system of claim 2, wherein said segment map includes protection input means for limiting translation of said indirect address segments to predetermined address locations in said main memory.

4. The data processing system of claim 1, wherein said memory management means includes write enable control line means to permit translation data to be modified in said memory management means such that other real address locations in said main memory may be specified by a given virtual address.

5. In a data processing system employing virtual memory management which includes a central processing unit, and a main memory with a plurality of locations for storage of data, each of said locations addressable by a real address specifying row and column control lines in said main memory, said central processing unit further including addressing means for providing a virtual address including a direct and an indirect address segment, said direct address segment corresponding to a portion of said real address identifying a particular location in said main memory, and said indirect segment corresponding to a virtual address identifying said particular location in said main memory, a method for accessing said main memory comprising the steps of:

(a) separating said virtual address from said central processing unit into said direct and indirect address segments, applying said direct address segment directly to one of the row and column control lines of said main memory which identify said particular memory location;

(b) translating said indirect address segment into a translated real address segment;

(c) applying said translated real address segment to the other of the row and column control lines of said main memory which identify said particular memory location;

(d) strobing said row and column control lines of said main memory with sequential pulses such that said control line to which said direct address segment is applied is strobed prior to the control line to which said translated real address segment is applied.

* * * * *